United States Patent Office 3,803,117

Patented Apr. 9, 1974

3,803,117

TETRAPEPTIDE

George Rogelio Flouret, Waukegan, Ill., assignor to Abbott Laboratories, North Chicago, Ill.

No Drawing. Filed Mar. 24, 1972, Ser. No. 237,941

Int. Cl. C07c *103/52*

U.S. Cl. 260—112.5 6 Claims

ABSTRACT OF THE DISCLOSURE

The new blocked tetrapeptide Y-Leu-($N^{\omega}$-R')Arg-Pro-Gly-R wherein R is hydroxy, methoxy or amino, R' is a suitabfe blocking group and Y is hydrogen or an easily removable protective group has been found to be a valuable intermediate for the preparation of large peptide chains, such as for istance, the decapeptide Gn-RH.

DETAILED DESCRIPTION OF THE INVENTION

Recent discovery of the aminocaid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, it has been found that small doses of Gn-RH, administered by intravenous injections to female sheep in the anestrus cycle, produces ovulation. The formula of the Gn-RH has been identified with the aminoacid sequence pyroGlu-His-Trp-Ser-Tyr-Gly-Leu-Arg-Pro-Gly-$NH_2$ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisingly good yields. The new method involves a minimum of group-protecting and -removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

It has now been found that in order to prepare the decapeptide referred to above, various new intermediates are necessary to accomplish the most practical synthesis for such large peptides. These intermediates require so-called protective groups on those functional groups that may interfere with the desired coupling reaction that extends the peptide chain to a large number of aminoacids. Such a protective group has to be bound sufficiently strongly to the aminoacid's functional group that it will remain attached thereto when the blocking group at the $N^{\alpha}$-position is removed in order to make that site reactive for coupling with a subsequent aminoacid. By properly selecting these protective groups, any other $N^{\alpha}$-blocked aminoacid can be attached to the $N^{\alpha}$-position of the present polypeptide and all protective groups can be removed at the point where the desired chain is completed.

The present invention is directed to a small peptide chain that contains a blocking and a protective group that fulfills the above requirement. It is therefore the main object of the present invention to provide a tetrapeptide of the formula Y-Leu-($N^{\omega}$-R')Arg-Pro-Gly-R wherein R represents hydroxy, methoxy or the amino group, R' is a protective group that protects the imino group of the arginine moiety and can be removed by a simple chemical step that leaves the aminoacid bonds intact, and Y is hydrogen or a blocking group that can be removed by a simple, mild chemical treatment which leaves the remainder of the molecule intact. More specifically, where Y is different from hydrogen, it is tert.-butoxycarbonyl (BOC), o - nitrophenylsulfenyl (NPS), 2 - (diphenyl)isopropyloxycarbonyl, benzyloxycarbonyl (CBZ) or phthalyl. R' may be nitro, p-nitrobenzyloxycarbonyl, tetrachloroisopropyloxyphthaloyl or p-tolylsulfonyl (tos.). Among these, nitro or tos. groups are preferred because they are removable by a simple treatment with catalytic hydrogenation or hydrofluoric acid. Others mentioned must be removed by more complex reactions.

In a simple embodiment, the new compounds of the present invention are prepared by reacting BOC-proline p-nitrophenyl ester with glycinamide or glycine methyl ester preferably by using an excess of the latter, and the obtained protected dipeptide is converted to Pro-Gly-R by a mild acid treatment. The free dipeptide is then reacted with BOC($N^{\omega}$-R')Arg in the presence of dicyclohexylcarbodiimide and an inert solvent. After removing the formed dicyclohexylurea, the mixture is stripped of the solvent and the residue is purified by chromatography. The $N^{\alpha}$-BOC group is easily removed by a mild acid treatment in an inert organic medium, which does not affect the remainder of the molecule. Coupling of this tripeptide with a suitable N-blocked leucine ester in the manner shown for obtaining the tripeptide produces the tetrapeptide carrying the $N^{\alpha}$-blocking group and protection at $N^{\omega}$ in arginine. The blocking group can be removed by a mild acid treatment in an inert organic solvent. Where R is methoxy, the free acid is obtained by hydrolysis in known manner; ammonolysis produces the analog wherein R is $NH_2$.

In order to illustrate the method for obtaining the compounds of the present invention, reference is made to the following examples which are, however, not to be interpreted as limiting the scope of this invention in any respect.

EXAMPLE 1

A solution of 514 mg. of prolylglycinamide in 8 ml. of pyridine is mixed at room temperature with 619 mg. of dicyclohexylcarbodiimide and 106.2 mg. of $N^{\alpha}$-benzyloxycarbonyl - $N^{\omega}$ - nitroarginine. After 16 hours, the formed dicyclohexylurea is filtered off and the filtrate is evaporated resulting in an oil. This oil is placed on a chromatographic column containing 35 g. of silica gel using 5% methanolic chloroform as the solvent. Elution of the column with 5% methanolic chloroform removes some of the impurities contained in the crude product. The pure material is eluted when the methanol concentration is increased to 15%. By combining the appropirate fractions and evaporation of the solvent, 1.319 g. (87% of theory) of pure CBZ-($N^{\omega}$-$NO_2$)Arg-Pro-Gly-$NH_2$ of undefined melting point is obtained. The material produces a correct elemental analysis and its NMR spectrum is consistent with the assigned structure. The compound shows $[\alpha]_D^{25}$ −25.4° (c.—1, DMF).

Similarly, the tripeptide is made wherein the CBZ-group is replaced with the BOC-group. However, this material again does not crystallize.

When the above Pro-Gly-$NH_2$ is replaced by an equimolar of Pro-Gly-$OCH_3$, the same reaction sequence yields the $N^{\alpha}$,$N^{\omega}$-diprotected Arg-Pro-Gly-$OCH_3$ which is hydrolyzed at room temperature in 6 hours with one molar equivalent of 1 N aqueous sodium hydroxy using a mixture of dimethylformamide/dioxan 1:1 as the solvent for the diprotected Arg-Pro-Gly-$OCH_3$ to Arg-Pro- Gly-OH carrying the selected blocking groups in the $N^{\alpha}$- and $N^{\omega}$-positions of Arg.

EXAMPLE 2

A solution of 1.013 g. of CBZ-($N^{\omega}$-$NO_2$)Arg-Pro-Gly-$NH_2$ from Example 1 in 8 ml. of acetic acid is treated with 8 ml. or 32% hydrobromic acid in acetic acid. After one hour, the solution is added to ether and the precipitate is separated, washed five times by suspending it in ether and decanting the supernatant from the solid. The solid is then treated in methanol with an ion exchange resin in its basic form and the resulting suspension is filtered. The resin is washed with 10% acetic acid in methanol and the combined wash liquor and filtrate is evaporated to a solid of undefined melting point. The elemental analysis confirms the structure ($N^{\omega}$-$NO_2$)Arg-Pro-Gly-$NH_2$ which shows a single spot TLC $R_f$ 0.15 in 15% methanol/chloroform.

EXAMPLE 3

A solution of 7.45 g. of ($N^{\omega}$-$NO_2$)Arg-Pro-Gly-$NH_2$ in 20 ml. of dimethylformamide is treated with 8.5 g. of BOC-Leu p-nitrophenyl ester (30% molar excess) by letting the mixture stand at room temperature for 16 hours. The solvent is then evaporated and the residual oil is placed on a chromatographic column containing 150 g. of silica gel. The column is first washed out with methanol/chloroform 3:97 which solvent was used also to place the oil on the column. The protected tetrapeptide is eluted with methanol/chloroform 10:90 and 15:85 and appropriate fractions are combined and evaporated to yield 7.52 g. (65% of theory) of the blocked tetrapeptide BOC-Leu-($N^{\omega}$-$NO_2$)Arg-Pro-Gly-$NH_2$ which has an undefined melting point; it shows $[\alpha]_D^{27}$ −44.7° (c.—1, DMF) and a correct elemental analysis. Its NMR-spectrum is consistent with the expected pattern and thin-layer chromatography in methanol/chloroform 15:85 shows a single component, $R_f$ 0.2.

When the above ester of BOC-Leu is replaced with the corresponding leucine esters carrying phthaloyl, benzyloxycarbonyl, p-nitrobenzyloxycarbonyl, 2-(diphenyl)isopropyloxycarbonyl, o-nitrophenylsulfenyl or trifluoroacetyl on the nitrogen as the blocking group, the correspondingly blocked tetrapeptides are obtained in the same manner as described above.

EXAMPLE 4

By following the procedure of Example 2 with 3.2 g. of the above $N^{\alpha}$-blocked tetrapeptide using 50 ml. of trifluoroacetic acid/methylene chloride 1:1 produces the above tetrapeptide wherein R is $NH_2$, R′ is $NO_2$ and Y is hydrogen in a yield of above 95% of theory. This compound has an undefined melting point but thin-layer chromatography shows that the obtained material is a single compound with $R_f$ 0.1 in methanol/chloroform 15:85.

When the starting material in Example 1 is replaced by BOC-($N^{\omega}$-tos.)Arg and the deblocking and chain-extension steps shown in Examples 2 and 3 are carried out as shown, the tetrapeptide of the above structure (R′=tos., Y=BOC, R=$NH_2$) is obtained. The ethanol recrystallized material melts at 152–3° C. and shows $[\alpha]_D^{26}$ −32° (c.—1.03 in DMF). The corresponding benzyloxycarbonyl-blocked tetrapeptide (R′=tos.) melts at 143–5° C. when recrystallized from ethanol and shows $[\alpha]_D^{26}$ −29° (c.—1.005 in DMF).

The synthesis shown above can be carried out in the same fashion when instead of prolyglycinamide one uses prolylglycine methyl ester, resulting after following the procedures of Examples 1–3 in Y-Leu-($N^{\omega}$-R′)Arg-Pro-Gly-$OCH_3$ wherein Y is preferably CBZ or BOC and R′ is $NO_2$ or tos. This compound can be hydrolyzed to the corresponding free acid and the blocking group Y can be removed in a mild acid treatment as shown in Examples 2 and 4.

The new tetrapeptide is extremely useful as an intermediate for making longer peptide chains, as for instance, in Gn-RH and is particularly well suited as a precursor in such a synthesis because of its optical configuration with Leu, Pro and Arg all being present in the L-form, and the retention of the protective group in the arginine moiety during the deblocking of the $N^{\alpha}$-position and during any desired subsequent coupling reactions with other aminoacids. During such deblocking and coupling reactions, the new intermediate is chemically and optically stable, i.e., no racemization takes place. The new tetrapeptide is particularly well suited to be coupled directly with the tetrapeptide Y-Trp-(O-R″)Ser-(O-R′)Tyr-Gly-OH wherein Y is selected from the above choices and R″ is a protective group similar to R′.

This coupling reaction and the use of the resulting octapeptide for making Gn-RH is shown in copending U.S. Ser. No. 219,567 of Jan. 20, 1972. A stepwise synthetic method leading from the tetrapeptide of this invention to Gn-RH adding, in sequence, glycine, O-protected hydrosine, O-protected serine, tryptophane, ($N^{IM}$-protected) histidine and pyroglutamic acid and the conversion thereof into Gn-RH is also demonstrated in U.S. Ser. No. 180,159 of Sept. 13, 1971.

I claim:

1. The optically active L-form of the tetrapeptide, Y-Leu-($N^{\omega}$-R′)Arg-Pro-Gly-R wherein R is hydroxy, methoxy or amino, R′ is a protective group attached to the imino group in the arginine moiety that can be removed by a chemical treatment that does not affect the aminoacid linkages, and wherein Y is hydrogen or a blocking group that can easily be removed by a chemical treatment which does not affect the aminoacid linkages or the above protective group.

2. A compound of claim 1 wherein R is hydroxy, methoxy or amino, R′ is p-toluenesulfonyl, p-nitrocarbobenzoxy, benzyloxycarbonyl, tetrachloroisopropyloxyphthaloyl or nitro, and Y is hydrogen, tert.-butoxycarbonyl, o-nitrophenylsulfenyl, phthalyl, triphenylmethyl, benzyloxycarbonyl or 2-(diphenyl)isopropyloxycarbonyl.

3. The compound of claim 2 wherein R is amino, R′ is nitro and Y is hydrogen.

4. The compound of claim 2 wherein R is amino, R′ is p-toluenesulfonyl and Y is hydrogen.

5. The compound of claim 2 wherein R is amino, R′ is p-toluenesulfonyl and Y is benzyloxycarbonyl.

6. The compound of claim 2 wherein R is amino, R′ is toluenesulfonyl and Y is tert.-butoxycarbonyl.

References Cited

Biochemical and Biophysical Research Comm. (1971), vol. 45, pp. 767–773 relied on.

ELBERT L. ROBERTS, Primary Examiner

U.S. Cl. X.R.

424—177